United States Patent
Matsumoto et al.

(10) Patent No.: US 6,722,958 B2
(45) Date of Patent: Apr. 20, 2004

(54) APPARATUS AND PROCESS FOR RECOVERING ABRASIVE

(75) Inventors: Akira Matsumoto, Machida (JP); Kazuki Hayashi, Saitama (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 10/133,956

(22) Filed: Apr. 26, 2002

(65) Prior Publication Data

US 2002/0168926 A1 Nov. 14, 2002

(30) Foreign Application Priority Data

May 8, 2001 (JP) .......................... 2001-137130

(51) Int. Cl.[7] .................................. B24B 7/00
(52) U.S. Cl. .......................... 451/60; 451/447
(58) Field of Search .................... 451/60, 447, 41, 451/285–289, 446; 210/193, 96.2, 662

(56) References Cited

U.S. PATENT DOCUMENTS 6,126,531 A * 10/2000 Iida et al. ................ 451/447
6,183,352 B1 * 2/2001 Kurisawa ................ 451/87
6,406,622 B1 * 6/2002 Tsuihiji et al. ........... 210/193
6,436,281 B2 * 8/2002 Hammer et al. .......... 210/96.2
6,482,325 B1 * 11/2002 Corlett et al. ............. 210/662
2003/0098069 A1 * 5/2003 Sund et al. ............ 137/487.5

FOREIGN PATENT DOCUMENTS

| JP | 10-118899 A | 5/1998 |
| JP | 2000-288935 A | 10/2000 |
| JP | 2000-308967 A | 11/2000 |

* cited by examiner

*Primary Examiner*—Lee D. Wilson
(74) *Attorney, Agent, or Firm*—Frishauf, Holtz, Goodman & Chick, P.C.

(57) ABSTRACT

An apparatus and a process for recovering an abrasive from a waste fluid of a chemical mechanical polishing (CMP) process. The apparatus comprises a pre-filter into which a waste fluid of a CMP process is introduced, a membrane separation apparatus into which filtered waste fluid obtained from the pre-filter is introduced, a washing unit wherein a concentrated slurry obtained from the membrane separation apparatus is washed with water and a post-filter wherein the concentrated slurry obtained from the washing unit is filtered. Particles of the abrasive are thereby efficiently recovered from a waste fluid discharged from a CMP process in semiconductor manufacturing factories and are reused.

27 Claims, 1 Drawing Sheet

APPARATUS AND PROCESS FOR RECOVERING ABRASIVE

BACKGROUND OF THE INVENTION

1. Field of the Invention

The present invention relates to an apparatus and a process for recovering abrasive. More particularly, the present invention relates to an apparatus and a process for recovering and reusing particles of abrasive from a waste fluid containing the abrasive which is discharged from the chemical mechanical polishing process (the CMP process) in semiconductor manufacturing factories.

2. Description of Related Art

It is required that the surface of coating films such as insulating films and thin films of metals which are formed on semiconductor wafers be a highly flat surface. As the means of forming the flat surface, the CMP process is conducted. In this process, polishing is conducted in the condition such that a slurry of abrasive is present between a polishing tool such as a polishing pad and a semiconductor wafer. As the abrasive used in the CMP process, fine particles of silica exhibiting excellent dispersion and having a uniform distribution of the particle diameter, fine particles of ceria exhibiting a great polishing rate and fine particles of alumina having a high hardness and stable are used. These abrasives are supplied by manufacturers as slurries in which particles having a prescribed diameter are dispersed in water in a prescribed concentration and are used after being diluted into a prescribed concentration for the actual use. In general, an agent for adjusting pH such as potassium hydroxide, ammonia, organic acids and amines, surfactants as the dispersants and oxidizing agents such as hydrogen peroxide, potassium iodate and iron(III) nitrate are added to the slurry in advance or at the time when the slurry is used for polishing.

Since the polishing slurry is used in a great amount and expensive and the amount of industrial waste materials must be decreased, reuse of the polishing slurry is desired. However, the waste fluid of the CMP process has a low concentration of the abrasive due to dilution and contains dusts formed from polishing pads and coating materials, fine particles formed by fracture of the abrasive and solid impurities having great diameters formed by aggregation of abrasive particles. When this waste fluid of the CMP process is reused as the abrasive for the polishing without treatments, problems arise in that the polishing rate decreases due to the decrease in the concentration of the abrasive and that the surface of wafers is damaged. Moreover, since additives are used in the abrasive, the waste fluid of the CMP process contains the additives left remaining in the fluid. Impurities of metal ions formed by the polishing are also contained. When the recovered slurry is reused, the impurities causes difficulty in the adjustment of the concentration and the concentration cannot be controlled readily. Due to the above reasons, the waste fluid of the CMP process cannot be recycled for reuse without treatments. When the waste fluid of the CMP process is reused, it is necessary that the waste fluid of the CMP process be treated for removing impurities such as coarse particles and salts from the fluid and be concentrated so that the slurry of the abrasive having the prescribed composition is prepared again.

Heretofore, various developments on the technology for the treatment of a waste fluid of the CMP process have been attempted. For example, in a process disclosed in Japanese Patent Application Laid-Open No. Heisei 10(1998)-118899, a waste fluid of the CMP process is treated by a microfiltration membrane to remove coarse particles and then by ultrafiltration membrane, agents are added to the treated fluid to adjust the concentration and the obtained fluid is reused as the slurry of the abrasive. The coarse particles can be removed and the damages on the surface of wafers can be suppressed in accordance with the above process. However, since the concentration of the abrasive and pH are adjusted by adding fresh agents while the additives and salts in the waste fluid are left remaining, these impurities cause a problem in the adjustment of the concentration and the adjustment of the concentration cannot be achieved satisfactorily. Moreover, adverse effects such as contamination of the product are exhibited. In particular, when an organic dispersant is used to control the distribution of the particle diameter so that the distribution of the particle diameter of the abrasive in the slurry is kept within a prescribed range, the concentration of the above impurities affects the distribution of the particle diameter to a great extent and it is important that the residual agents and salts are removed. When a slurry of a silica-based abrasive is used, an alkaline agent is used to adjust the distribution of the particle diameter. Since pH of the slurry decreases due to dilution by the washing with ultrapure water after the polishing in accordance with the CMP process, the alkaline agent is added to optimize the distribution of the particle diameter. However, even when potassium hydroxide is added after coarse particles have been removed in accordance with a conventional process, pH cannot be adjusted sufficiently due to the difficulty caused by the residual salts and, therefore, the distribution of the particle diameter cannot be adjusted sufficiently. In particular, when a slurry of a silica-based abrasive is used, the behavior exhibited by the addition of a solution of potassium hydroxide in the presence of a colloidal substance is different from that in the absence of colloidal substances. For example, potassium hydroxide is consumed for dissolving and converting colloidal silica into soluble silica and for forming hydroxyl group on the surface of colloidal silica. Therefore, the relation between the concentration of the added potassium hydroxide and pH varies depending on the condition and cannot be used as the reference to the operation. Therefore, the removal of the residual colloidal substances is important when a slurry of a silica-based abrasive is used.

In a process disclosed in Japanese Patent Application Laid-Open No. 2000-288935, a waste fluid of the CMP process is treated by a microfiltration membrane to remove coarse particles, the obtained filtrate is concentrated by centrifugation, the concentrated fluid is washed with water and, where necessary, the size of particles, the concentration and pH are adjusted. However, this process has drawbacks in that the concentration of the abrasive is not sufficiently increased and that, when the fluid is treated by strong centrifugation to increase the concentration, the suitable size as the abrasive cannot be maintained due to an increase in the size of the abrasive or solidification of the abrasive and the load to the means of membrane separation in the following step markedly increases.

SUMMARY OF THE INVENTION

The present invention has an object of providing an apparatus and a process for efficiently recovering and reusing particles of abrasive from a waste fluid containing the abrasive which is discharged from the CMP process in semiconductor manufacturing factories.

As the result of intensive studies by the present inventors to achieve the above object, it was found that impurities such as salts and organic substances in a waste fluid of the CMP process could be effectively separated and a slurry comprising particles of the abrasive having a high purity and a suitable diameter could be recovered when a combination comprising a means of pre-filtration by which the entire amount of the waste fluid was filtered and coarse particles were removed, a means of membrane separation in which the filtered waste fluid obtained from the means of pre-filtration was introduced and concentrated, a means of washing by which the concentrated slurry obtained from the means of membrane separation was washed and a means of post-filtration by which the slurry concentrated by the means of membrane separation and washed by the means of washing was filtered and the size of the particles of the abrasive was adjusted as the last step was used, the concentrated slurry obtained by the means of membrane separation was diluted and dispersed again by adding water and the obtained slurry was washed with water and concentrated again by the means of membrane separation. The present invention has been completed based on this knowledge.

The present invention provides:

(1) An apparatus for recovering abrasive from a waste fluid of a CMP process, the apparatus comprising a means of pre-filtration into which the waste fluid of a CMP process is introduced, a means of membrane separation into which a filtered waste fluid obtained from the means of pre-filtration is introduced, a means of washing by which a concentrated slurry obtained from the means of membrane separation is washed with water and a means of post-filtration by which the concentrated slurry obtained from the means of washing is filtered;

(2) An apparatus described in (1), which comprises a means of adjustment of at least one of pH and a concentration disposed between the means of membrane separation and the means of post-filtration or after the means of post-filtration;

(3) An apparatus described in (1), wherein the means of membrane separation is a membrane separation apparatus comprising a microfiltration membrane having a pore size of 0.05 to 0.2 μm;

(4) An apparatus described in (2), wherein the means of membrane separation is a membrane separation apparatus comprising a microfiltration membrane having a pore size of 0.05 to 0.2 μm;

(5) An apparatus described in (1), wherein the means of pre-filtration and the means of post-filtration are microfilters of a dead end filtration type equipped with a microfiltration membrane having a pore size of 10 to 100 μm;

(6) An apparatus described in (2), wherein the means of pre-filtration and the means of post-filtration are microfilters of a dead end filtration type equipped with a microfiltration membrane having a pore size of 10 to 100 μm;

(7) An apparatus described in (3), wherein the means of pre-filtration and the means of post-filtration are microfilters of a dead end filtration type equipped with a microfiltration membrane having a pore size of 10 to 100 μm;

(8) An apparatus described in (4), wherein the means of pre-filtration and the means of post-filtration are microfilters of a dead end filtration type equipped with a microfiltration membrane having a pore size of 10 to 100 μm;

(9) An apparatus described in (1), wherein the abrasive is silica-based fine particles;

(10) An apparatus described in (2), wherein the abrasive is silica-based fine particles;

(11) An apparatus described in (3), wherein the abrasive is silica-based fine particles;

(12) An apparatus described in (4), wherein the abrasive is silica-based fine particles;

(13) An apparatus described in (5), wherein the abrasive is silica-based fine particles;

(14) An apparatus described in (6), wherein the abrasive is silica-based fine particles;

(15) An apparatus described in (7), wherein the abrasive is silica-based fine particles;

(16) An apparatus described in (8), wherein the abrasive is silica-based fine particles;

(17) An apparatus described in (1), wherein the abrasive is ceria-based fine particles;

(18) An apparatus described in (2), wherein the abrasive is ceria-based fine particles;

(19) An apparatus described in (3), wherein the abrasive is ceria-based fine particles;

(20) An apparatus described in (4), wherein the abrasive is ceria-based fine particles;

(21) An apparatus described in (5), wherein the abrasive is ceria-based fine particles;

(22) An apparatus described in (6), wherein the abrasive is ceria-based fine particles;

(23) An apparatus described in (7), wherein the abrasive is ceria-based fine particles;

(24) An apparatus described in (8), wherein the abrasive is ceria-based fine particles;

(25) A process for recovering abrasive from a waste fluid of a CMP process, the process comprising filtering an entire amount of the waste fluid of a CMP process with a pre-filter to remove coarse particles by catching with the pre-filter, concentrating the filtered waste fluid discharged from the pre-filter by circulating through a microfilter comprising a filtration membrane, washing an obtained concentrated slurry with water to remove impurities soluble in water and fine dusts formed by polishing, concentrating the washed slurry with the microfilter and filtering the concentrated slurry with a post-filter; and

(26) A process described in (25), wherein at least one of pH and a concentration of the slurry washed and concentrated with the microfilter or the slurry obtained by filtering the washed and concentrated slurry with the post-filter is adjusted by adding an agent.

Figure 1:
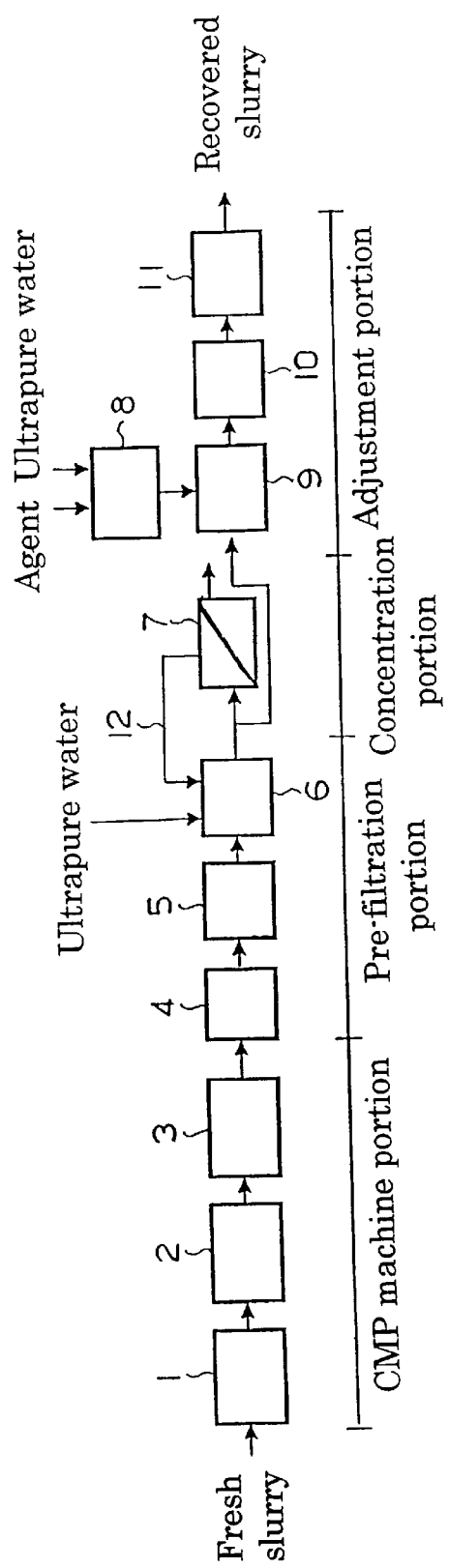
FIG. 1 shows a schematic flow chart exhibiting an embodiment of the apparatus for recovering abrasive of the present invention.

The numbers in FIG. 1 have the following meanings:

1: A slurry supply tank
2: A CMP machine
3: A waste fluid tank
4: A slurry receiving tank
5: A filter
6: A filtered waste fluid tank
7: A means of membrane separation
8: A dilution tank for an agent
9: An adjustment tank
10: A filter
11: A stirred slurry tank
12: A piping for a concentrated slurry

DESCRIPTION OF THE PREFERRED EMBODIMENTS

FIG. 1 shows a schematic flow chart exhibiting an embodiment of the apparatus for recovering abrasive of the present invention.

The apparatus for recovering abrasive of the present invention comprises a CMP machine portion, a pre-filtration portion, a concentration portion and an adjustment portion. The CMP machine portion comprises a slurry supply tank 1 in which a fresh slurry is diluted to a prescribed concentration and stored, a CMP machine 2 by which a wafer is polished with the slurry supplied from the slurry supply tank and a waste fluid tank 3 in which a waste fluid discharged after the polishing is stored. The pre-filtration portion comprises a slurry receiving tank 4 in which a waste fluid discharged from the CMP machine portion is stored, a filter 5 which is a means of pre-filtration for removing coarse particles in the waste fluid supplied from the slurry receiving tank by filtration and a filtered waste fluid tank 6 in which the waste fluid from which coarse particles have been removed with the filter is stored. The filtered waste fluid tank has a means of supplying ultrapure water as the means of washing. The concentration portion has a means of membrane separation 7 by which the filtered waste fluid supplied from the pre-filtration portion is concentrated. The adjustment portion comprises an adjustment tank 9 which is a means of adjustment, a filter 10 which is a means of post-filtration and a stirred slurry tank 11 in which the recovered slurry is stored. In the adjustment tank 9, an agent such as an alkali and a dispersant diluted in a dilution tank for an agent 8 is added to the slurry which has been concentrated by the means of membrane separation and washed by the means of washing and the concentration of the slurry is adjusted. By the filter 10, coarse particles formed by aggregation in the slurry supplied from the adjustment tank are removed so that the distribution of the particle diameter of the abrasive is made uniform.

The waste fluid discharged from the CMP machine and containing abrasive is received into the slurry receiving tank 4. The waste fluid in the slurry receiving tank is then filtered with the filter 5 which is a means of pre-filtration for removing coarse particles as the step before the means of membrane separation and coarse particles such as dusts of polishing pads having a great diameter of about 0.5 $\mu$m or greater are removed. By removing the impurities having a great diameter in the waste fluid, the load to the means of membrane separation can be decreased. When a microfilter (MF) having a pore size greater than the abrasive and smaller than the dusts formed by polishing is used as the filter, particles of the abrasive having small diameters are also caught with the filter due to formation of a cake layer on the surface of the membrane and, as the result, serious clogging takes place. Therefore, a microfiltration membrane having an opening larger than dusts formed by polishing is suitable. A microfilter having a pore size of 10 to 100 $\mu$m is preferable and a microfilter having a pore size of 25 to 75 $\mu$m is more preferable. The material of the membrane of the microfilter is not particularly limited. Examples of the material of the membrane include polypropylene, polycarbonates, cellulose triacetate, polyamides, polyvinyl chloride and polyvinyl fluoride. A microfilter which is made of the above material and has a filtration element having a multi-layer structure in which the pore size decreases from the primary side to the secondary side can be preferably used.

A microfilter of the dead end filtration type equipped with a filtration membrane having a pore size of 10 to 100 $\mu$m is suitable as the filter 5. The entire amount of the abrasive can be recovered with this filter.

The condition of the filtration with the microfilter is not particularly limited. It is preferable that the entire amount of the waste fluid is filtered under a pressure of 0.01 to 0.5 MPa. When the pressure difference at the inlet and at the outlet exceeds 0.01 MPa during the operation, it is preferable that the membrane is treated by the reverse washing or replaced with a fresh membrane. Although not shown in the Figure, the life of the membrane can be extended by disposing a plurality of stages in the filter 5 in a manner such that filters having greater pore sizes are disposed at earlier stages and filters having smaller pore sizes are disposed at later stages.

The filtered waste fluid which has been treated by the filter 5 as the means of pre-filtration is stored in the filtered waste fluid tank 6 and then transferred to the concentration portion comprising the means of membrane separation 7. The membrane used for the means of membrane separation is not particularly limited. Ceramic membranes of the monolith type formed with sintered aluminum oxide and ceramic membranes formed with sintered silicon nitride and mainly comprising β-type silicon nitride crystals having a cylindrical shape are preferably used.

The ceramic membrane mainly comprising β-type silicon nitride crystals having a cylindrical shape can be produced by preparing a molded material from a mixture of silicon nitride powder with powder of other additives, followed by treating the article by heating at a high temperature to form a porous material and treating the obtained porous material with an acid and an alkali so that the additives other than silicon nitride are dissolved and removed. The ceramic membrane having a fine texture formed with entangled β-type silicon nitride crystals having a cylindrical shape has a great fraction of pores and a high strength and can be formed into an element having a single layer honey comb structure. For the waste fluid of the CMP process containing organic dispersants, it is preferable that a ceramic membrane of silicon nitride having a great fraction of pores and giving a high flux at a low flow rate is used so that clogging with the dispersant and the slurry can be prevented. The pore size of the filtration membrane used for the means of membrane separation 7 is not particularly limited. It is preferable that an ultrafiltration membrane (UF) or a microfiltration membrane (MF) having a pore size of 0.001 to 0.5 $\mu$m is used. It is more preferable that MF having a pore size of 0.05 to 0.2 $\mu$m is used. MF has a greater strength and fewer damages are formed on the membrane in the continued concentration of the abrasive than UF. The degree of concentration by the means of membrane separation is not particularly limited. In general, it is preferable that the condition of concentration is adjusted so that the concentration of the abrasive in the concentrated slurry is 5 to 50% by weight. As for the condition of the treatment, it is preferable that a batch or semi-batch process for concentration with a cross flow is conducted and the concentrated slurry is circulated to the filtered waste fluid tank 6 via a piping for a concentrated slurry 12 at a pressure of 0.01 to 0.5 MPa. Water separated by passing the fluid through the means of membrane separation may be removed to the outside of the system and treated as waste water. It is preferable that a portion of the separated water is stored in a pit and used as washing water in the reverse washing of the membrane.

The means of washing which is used for washing the concentrated slurry obtained by the means of membrane separation in the apparatus of the present embodiment comprises a means of supplying washing water to the filtered waste fluid tank and a means of diluting the concentrated slurry in the filtered waste fluid tank with washing water. The washing with water can be conducted by diluting the concentrated slurry by adding the washing water and dispersing the slurry again, followed by concentrating the obtained dispersion by separation with a membrane. By using ultrapure water as the washing with water, impurities such as salts and organic substances can be effectively removed and a slurry of the abrasive having a high purity can be obtained. The dilution can be conducted in a manner such that washing water is added from the means of supplying washing water to the concentrated slurry which has been concentrated to a prescribed concentration and the diluted slurry is stirred while the degree of concentration of the concentrated slurry of the abrasive is monitored by a concentration meter of the Coriolis type or a level meter. The concentration and the dilution can be conducted simultaneously by circulating the concentrated slurry which has been diluted with the washing water between the means of membrane separation 7 and the filtered waste fluid tank 6. In the washing with water, impurities such as salts, organic substances and fine dusts formed by the polishing pass through the membrane as a solution or suspension in water but the abrasive does not pass through the membrane. Therefore, a concentrated slurry of the abrasive from which the impurities have been removed by the means of membrane separation can be obtained. When the amount of water used for the washing is excessively small, a sufficient effect of the washing is not obtained. When the amount of water used for the washing is excessively great, cost of the treatment for recovering water increases due to the increase in the amount of water. In general, it is preferable that the washing water is used in an amount by volume 10 to 100 times the volume of the concentrated slurry and the washing with water is conducted twice. In general, ultrapure water is used as the washing water. It is preferable that ultrapure water containing a suitable amount of a dispersant is used so that aggregation of the abrasive is prevented. In the apparatus of the present invention, a means of supplying washing water is disposed in a filtered waste fluid tank and the means of washing comprises these members. However, the means of washing is not limited to the construction comprising the filtered waste fluid tank. The means of washing may also be constructed in a manner such that a concentrated slurry tank for storing the concentrated slurry may be disposed before the adjustment tank and the washing water may be supplied to this tank. In this case, the concentrated slurry is circulated between the means of membrane separation 7 and the concentrated slurry tank.

The slurry which has been washed and concentrated to the prescribed concentration is supplied from the means of washing to the adjustment tank 9 as the means of adjustment of the following step. Agents such as an alkaline agent diluted with ultrapure water and, where necessary, a dispersant are supplied and pH and the concentration are adjusted to the prescribed values. When the apparatus of the present invention is used, the adjustment of pH and the concentration can be conducted easily since salts and organic substances have been removed by the washing and the slurry which contains little impurities such as salts and organic substances and is as excellent as the fresh slurry can be recovered. The concentration of the abrasive can be detected by using a concentration meter of the Coriolis type and pH can be adjusted by using a pH meter. The slurry adjusted at the prescribed pH and the prescribed concentration is treated for removal of rough abrasives formed by aggregation with a filter 10 as the means of post-filtration which is disposed after the adjustment tank 9 so that the slurry has the desired distribution of the particle diameter, stored in a stirred slurry tank 11 and taken out as the recovered slurry. As the filter used in this step, the same filter as that used as the means of pre-filtration in the step before the means of membrane separation such as the microfiltration membrane can be used. It is preferable that a microfilter of the dead end filtration type equipped with a filtration membrane having a pore size of 10 to 100 $\mu$m is used. The filter is not limited to a single stage filter but a filter having a plurality of stages may also be used. In the apparatus of the present invention, the stirred slurry tank 11 is not always necessary. The recovered slurry may be returned directly to the slurry supply tank 1 in the CMP machine portion and reused. In the above embodiment, the means of adjustment is disposed between the means of membrane separation and the means of post-filtration. The means of adjustment may also be disposed after the means of post-filtration depending on the condition such as the type of the abrasive.

To summarize the advantages of the present invention, by using the apparatus for recovering abrasive of the present invention, a slurry of particles of abrasive which can be easily reused as the slurry of abrasive can be efficiently obtained from a waste fluid of the CMP apparatus. Moreover, since the concentration is adjusted after impurities have been removed by washing with water, a slurry having the properties as excellent as the fresh slurry can be recovered. Therefore, by using the apparatus of the present invention, the amount of the slurry of expensive abrasive used in the CMP process of wafers can be decreased and the cost of the slurry can be decreased. Since the amount of the waste fluid is decreased, the load on the system for treating the waste fluid can be decreased and the amount of industrial wastes which must be treated can be decreased.

What is claimed is:

1. An apparatus for recovering an abrasive from a waste fluid of a chemical mechanical polishing process, the apparatus comprising a means for pre-filtration into which the waste fluid of a chemical mechanical polishing process is introduced, a means for membrane separation into which a filtered waste fluid obtained from the means of pre-filtration is introduced, a means for washing by which a concentrated slurry obtained from the means for membrane separation is washed with water and a means for post-filtration by which the concentrated slurry obtained from the means for washing is filtered.

2. The apparatus according to claim 1, which comprises a means for adjustment of at least one of pH and a concentration disposed between the means of membrane separation and the means of post-filtration or after the means of post-filtration.

3. The apparatus according to claim 2, wherein the means for membrane separation is a membrane separation apparatus comprising a microfiltration membrane having a pore size of 0.05 to 0.2 $\mu$m.

4. The apparatus according to claim 3, wherein the means for pre-filtration and the means for post-filtration are dead end filtration microfilters equipped with a microfiltration membrane having a pore size of 10 to 100 $\mu$m.

5. The apparatus according to claim 4, wherein the abrasive comprises silica-based fine particles.

6. The apparatus according to claim 4, wherein the abrasive comprises ceria-based fine particles.

7. The apparatus according to claim 3, wherein the abrasive comprises silica-based fine particles.

8. The apparatus according to claim 3, wherein the abrasive comprises ceria-based fine particles.

9. The apparatus according to claim 2, wherein the means for pre-filtration and the means for post-filtration are dead end filtration microfilters equipped with a microfiltration membrane having a pore size of 10 to 100 μm.

10. The apparatus according to claim 9, wherein the abrasive comprises silica-based fine particles.

11. The apparatus according to claim 9, wherein the abrasive comprises ceria-based fine particles.

12. The apparatus according to claim 2, wherein the abrasive comprises silica-based fine particles.

13. The apparatus according to claim 2, wherein the abrasive comprises ceria-based fine particles.

14. The apparatus according to claim 1, wherein the means for membrane separation is a membrane separation apparatus comprising a microfiltration membrane having a pore size of 0.05 to 0.2 μm.

15. The apparatus according to claim 14, wherein the means for pre-filtration and the means for post-filtration are of a dead end filtration microfilters equipped with a microfiltration membrane having a pore size of 10 to 100 μm.

16. The apparatus according to claim 15, wherein the abrasive comprises silica-based fine particles.

17. The apparatus according to claim 15, wherein the abrasive comprises ceria-based fine particles.

18. The apparatus according to claim 14, wherein the abrasive comprises silica-based fine particles.

19. The apparatus according to claim 14, wherein the abrasive comprises ceria-based fine particles.

20. The apparatus according to claim 1, wherein the means for pre-filtration and the means of post-filtration are microfilters of a dead end filtration type equipped with a microfiltration membrane having a pore size of 10 to 100 μm.

21. The apparatus according to claim 20, wherein the abrasive comprises silica-based fine particles.

22. The apparatus according to claim 20, wherein the abrasive comprises ceria-based fine particles.

23. The apparatus according to claim 1, wherein the abrasive comprises silica-based fine particles.

24. The apparatus according to claim 1, wherein the abrasive comprises ceria-based fine particles.

25. A process for recovering an abrasive from a waste fluid of a chemical mechanical polishing process, the process comprising filtering an entire amount of the waste fluid of a chemical mechanical polishing process with a pre-filter to remove coarse particles by catching the coarse particles with the pre-filter to obtain a filtered waste, concentrating the filtered waste fluid discharged from the pre-filter by circulating the filtered waste fluid through a microfilter comprising a filtration membrane to obtain a concentrated slurry, washing the obtained concentrated slurry with water to remove impurities soluble in water and fine dusts formed by polishing to obtain a washed slurry, concentrating the washed slurry with the microfilter to obtain a concentrated washed slurry and filtering the concentrated washed slurry with a post-filter.

26. The process according to claim 25, wherein at least one of pH and a concentration of the slurry washed and concentrated with the microfilter or the slurry obtained by filtering the washed and concentrated slurry with the post-filter is adjusted by adding an agent.

27. The process according to claim 25, wherein the washing comprises diluting and re-dispersing the concentrated slurry.

* * * * *